No. 810,711. PATENTED JAN. 23, 1906.
A. CALLESON, A. D. ADRIANCE & A. DUPPLER.
WARP TWISTING-IN MACHINE.
APPLICATION FILED DEC. 24, 1904
12 SHEETS—SHEET 1.
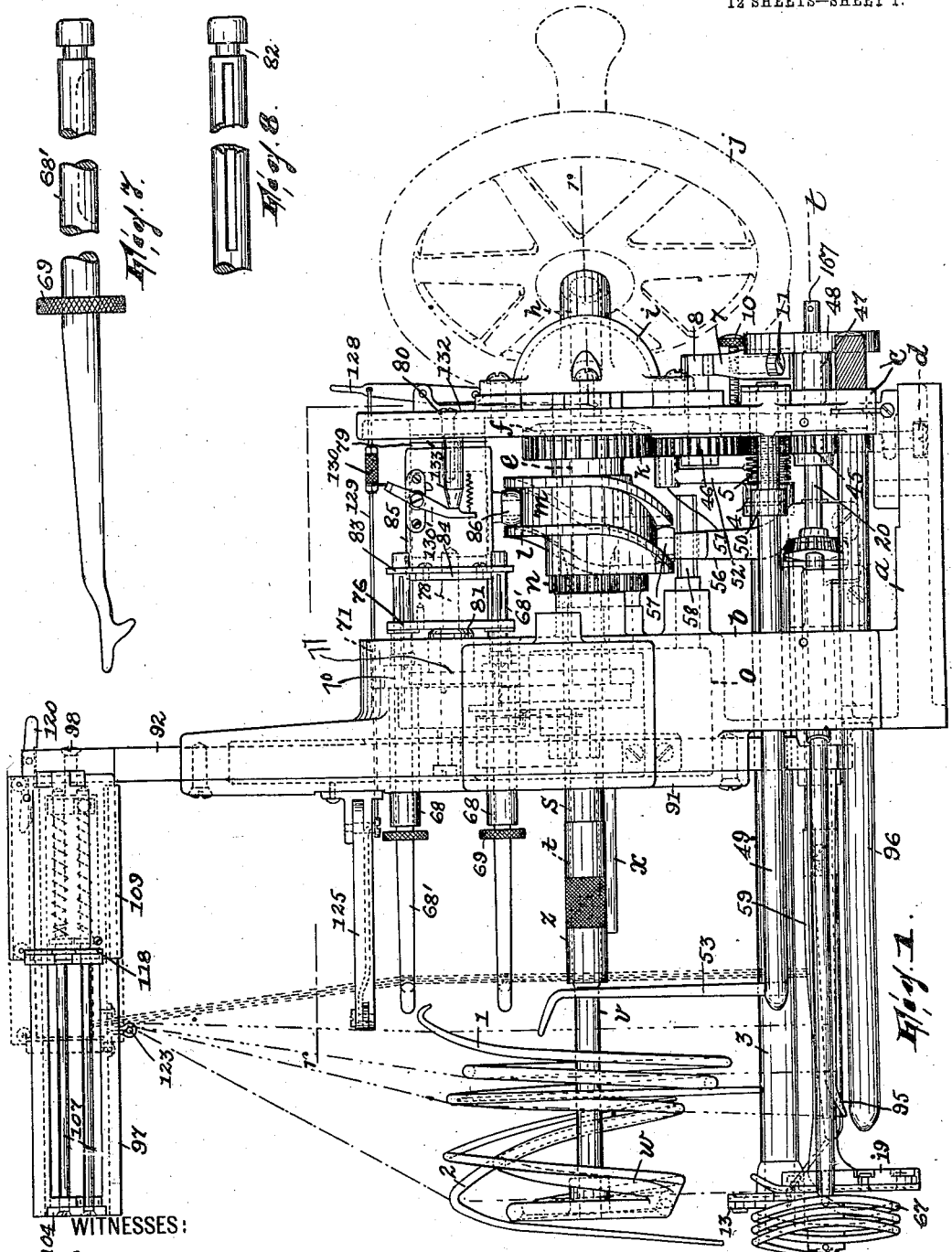

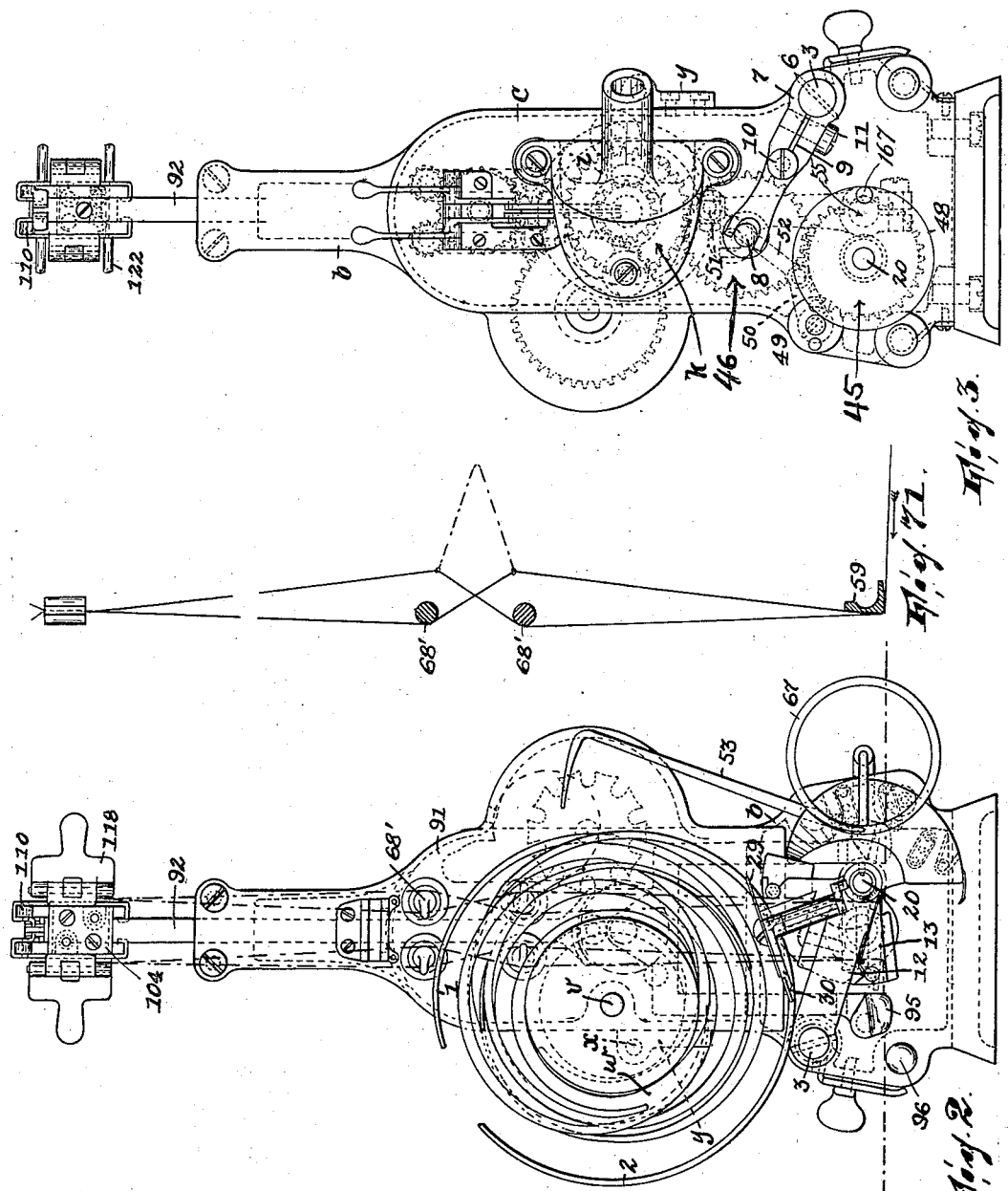

No. 810,711. PATENTED JAN. 23, 1906.
A. CALLESON, A. D. ADRIANCE & A. DUPPLER.
WARP TWISTING-IN MACHINE.
APPLICATION FILED DEC. 24, 1904
12 SHEETS—SHEET 3.
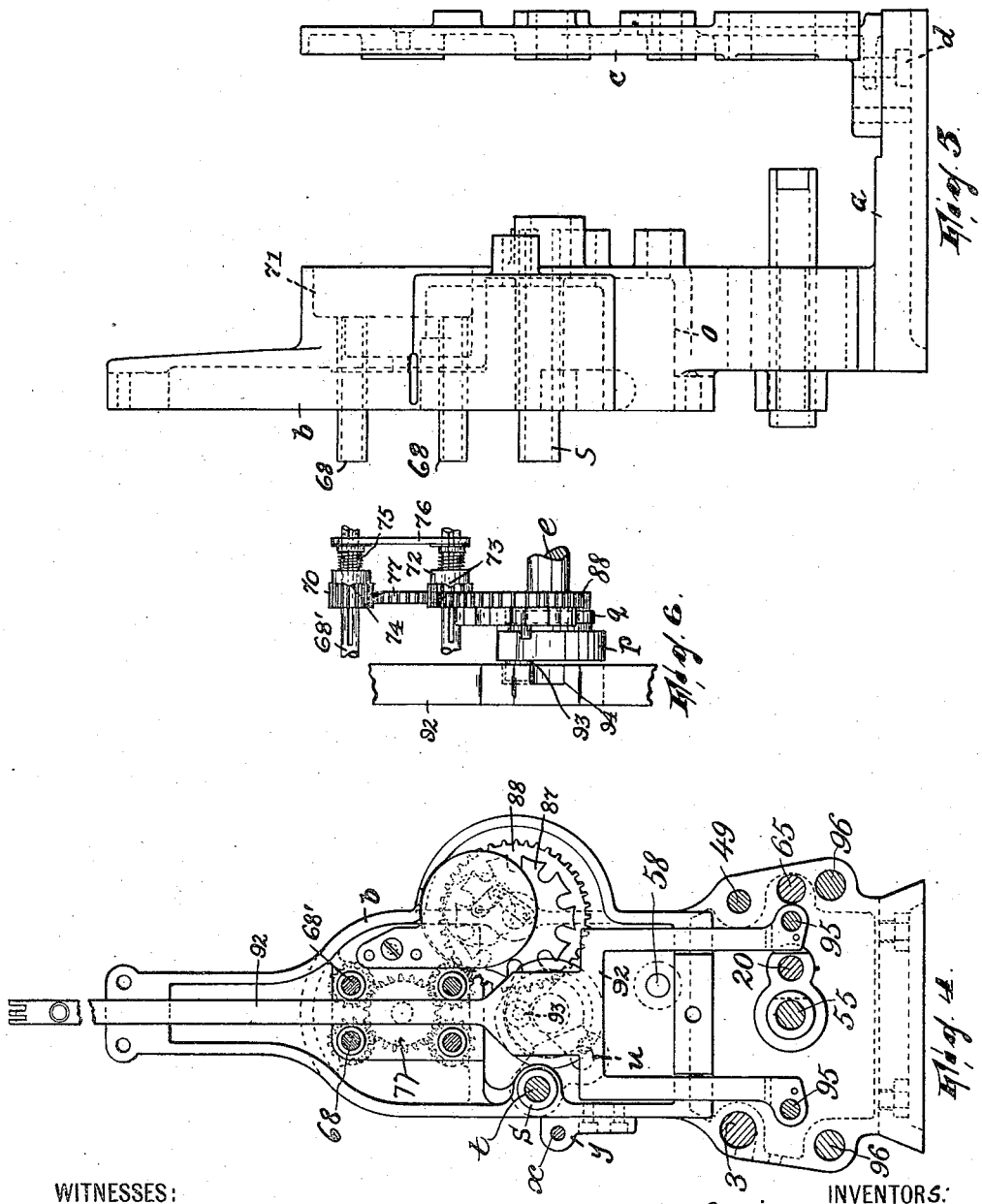

No. 810,711. PATENTED JAN. 23, 1906.
A. CALLESON, A. D. ADRIANCE & A. DUPPLER.
WARP TWISTING-IN MACHINE.
APPLICATION FILED DEC. 24, 1904.
12 SHEETS—SHEET 4.
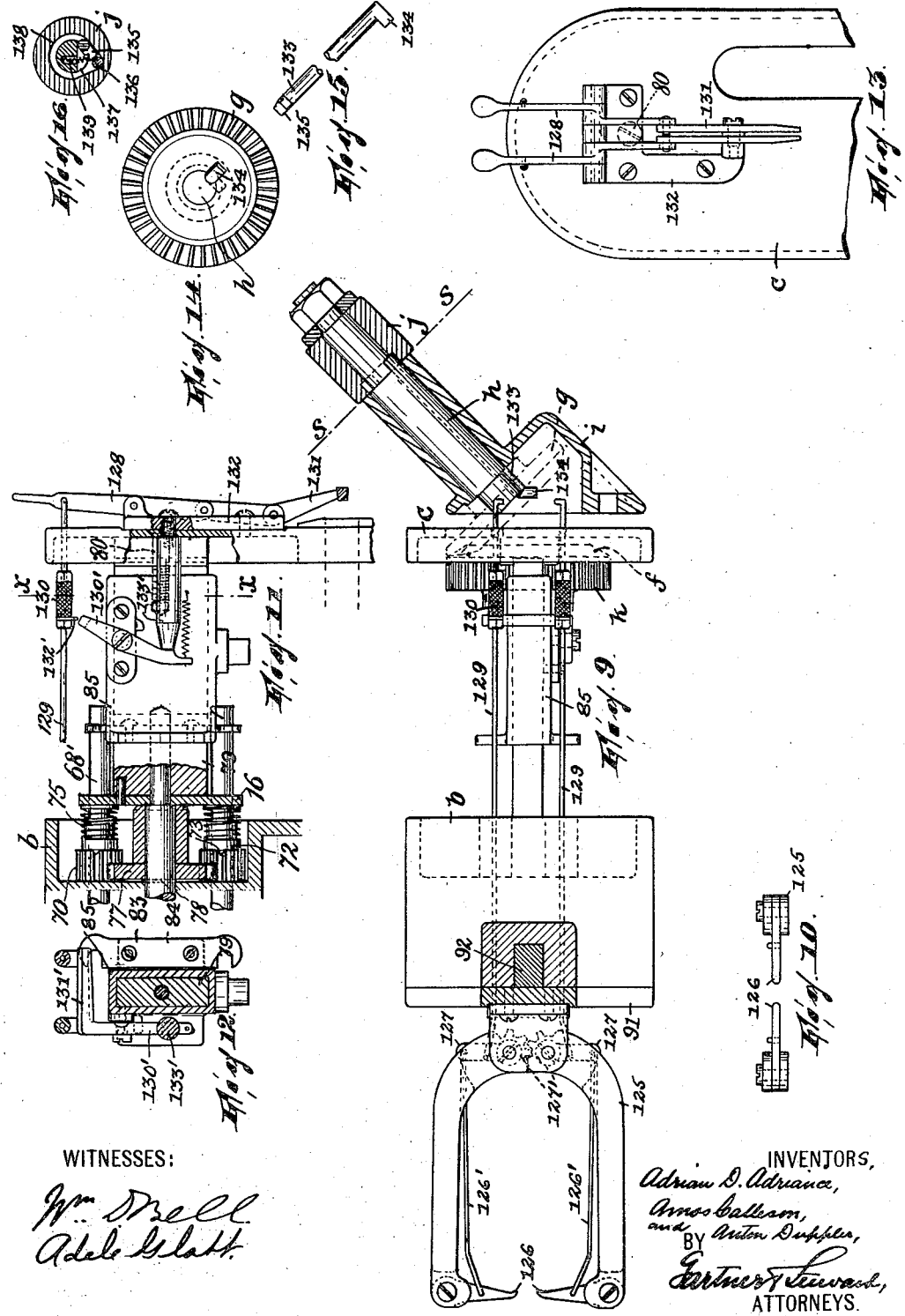
WITNESSES:
INVENTORS,
ATTORNEYS.

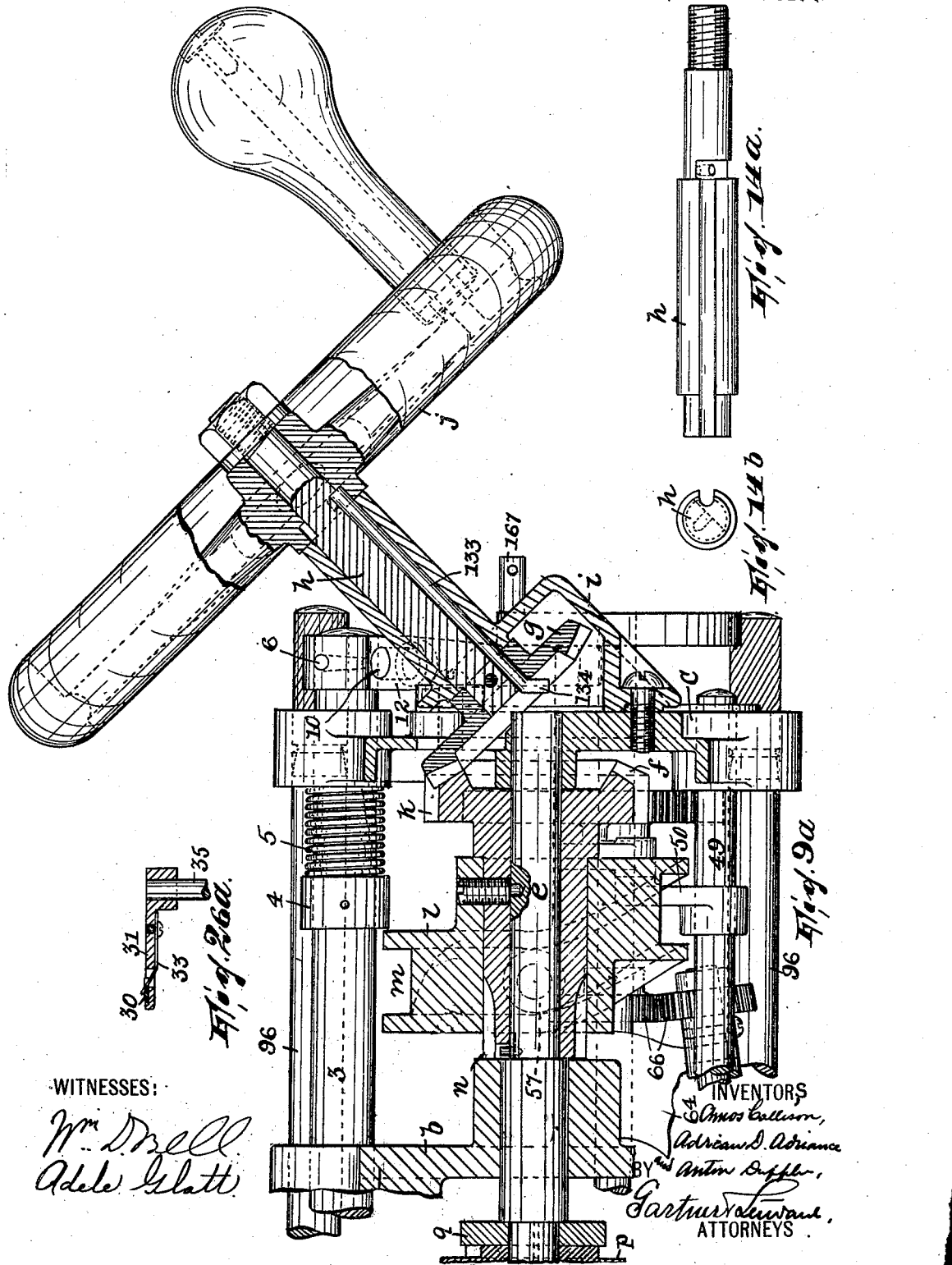

No. 810,711. PATENTED JAN. 23, 1906.
A. CALLESON, A. D. ADRIANCE & A. DUPPLER.
WARP TWISTING-IN MACHINE.
APPLICATION FILED DEC. 24, 1904.
12 SHEETS—SHEET 6.
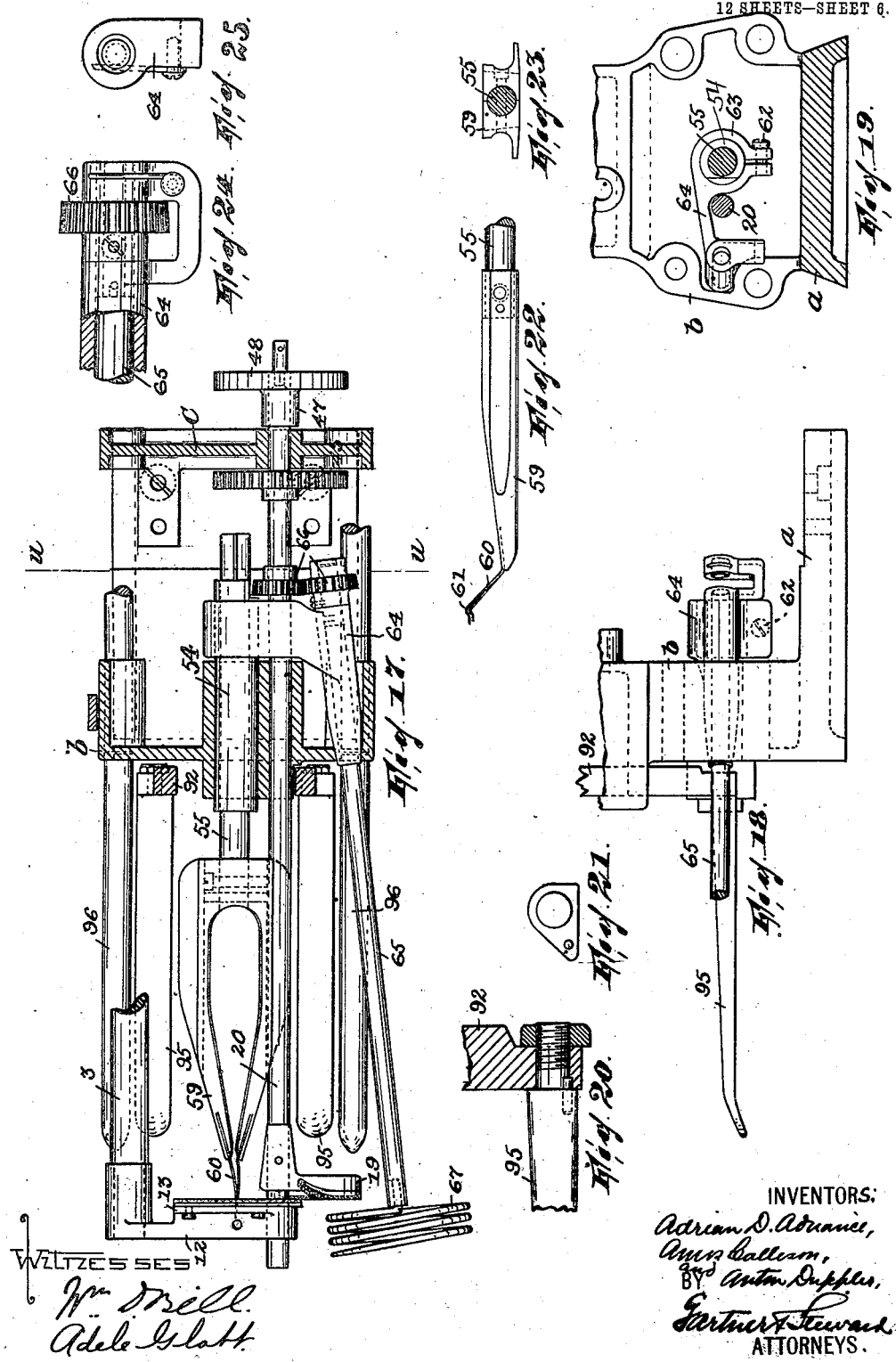
INVENTORS:
Adrian D. Adriance,
Ann Calleson,
BY Anton Duppler,
Gartner & Steward,
ATTORNEYS.

No. 810,711. PATENTED JAN. 23, 1906.
A. CALLESON, A. D. ADRIANCE & A. DUPPLER.
WARP TWISTING-IN MACHINE.
APPLICATION FILED DEC. 24, 1904.
12 SHEETS—SHEET 7.
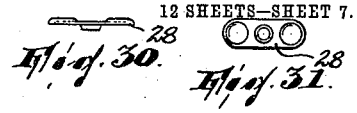
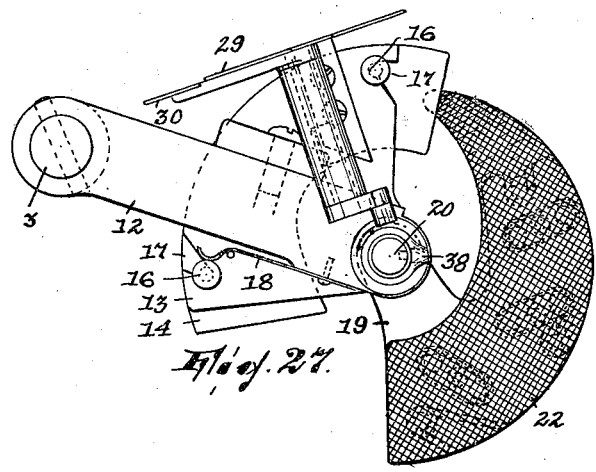
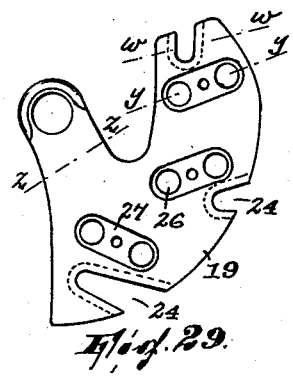
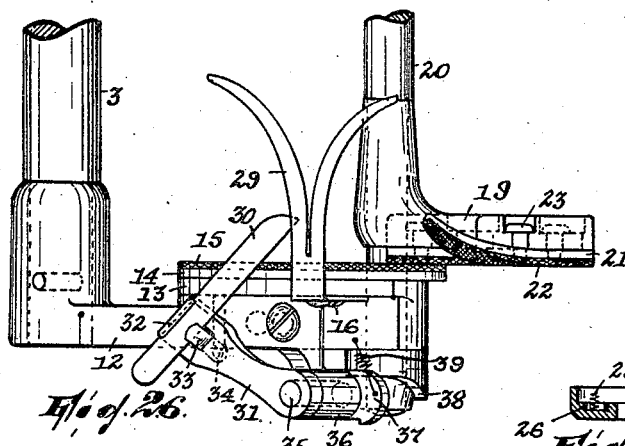
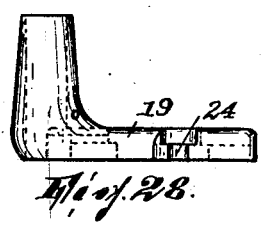
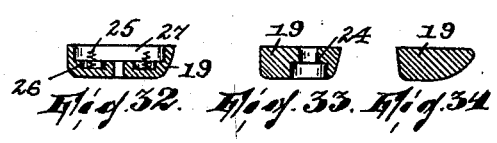
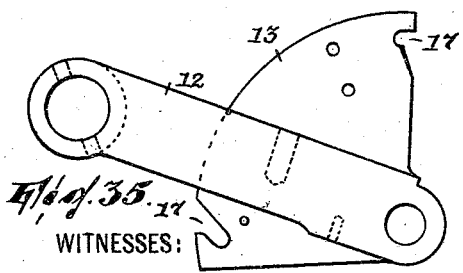
WITNESSES:
Wm D Bell
Adele Glatt
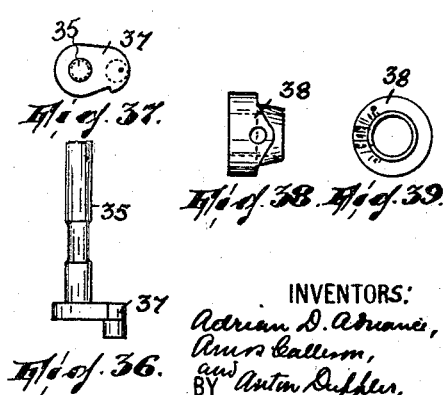
INVENTORS:
Adrian D. Adriance,
Amos Calleson,
and Anton Duppler,
BY Gartner & Steward,
ATTORNEYS.

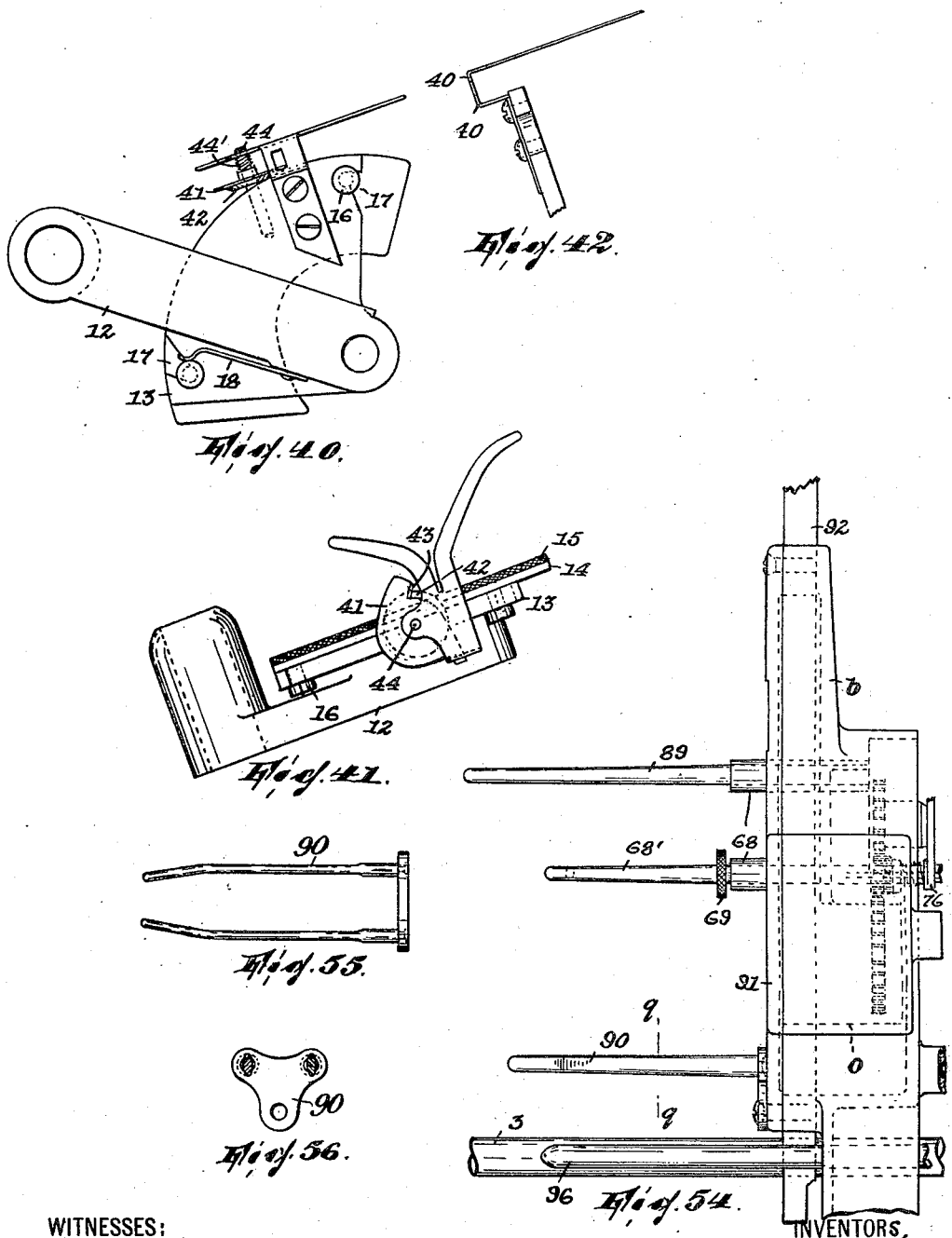

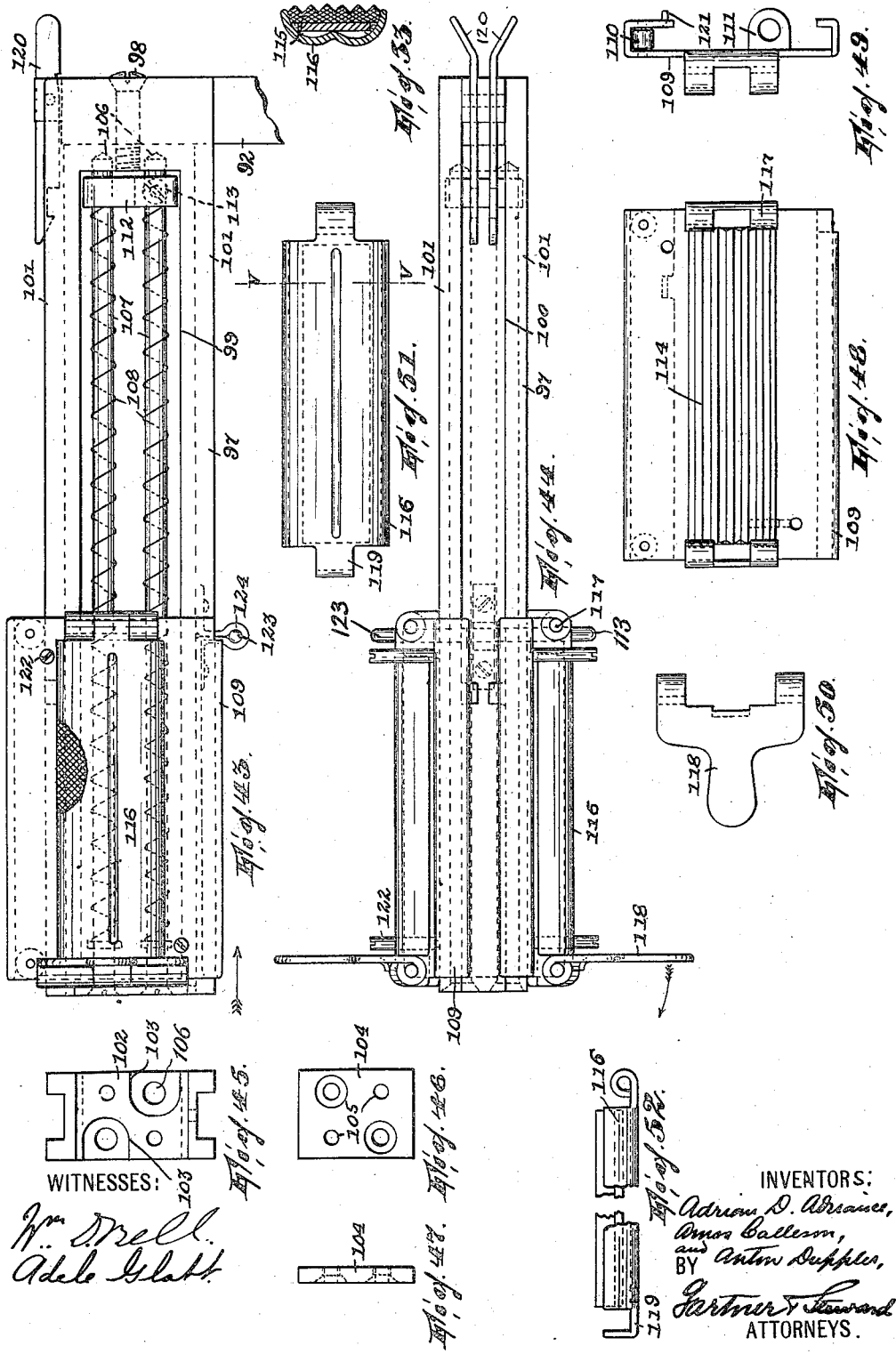

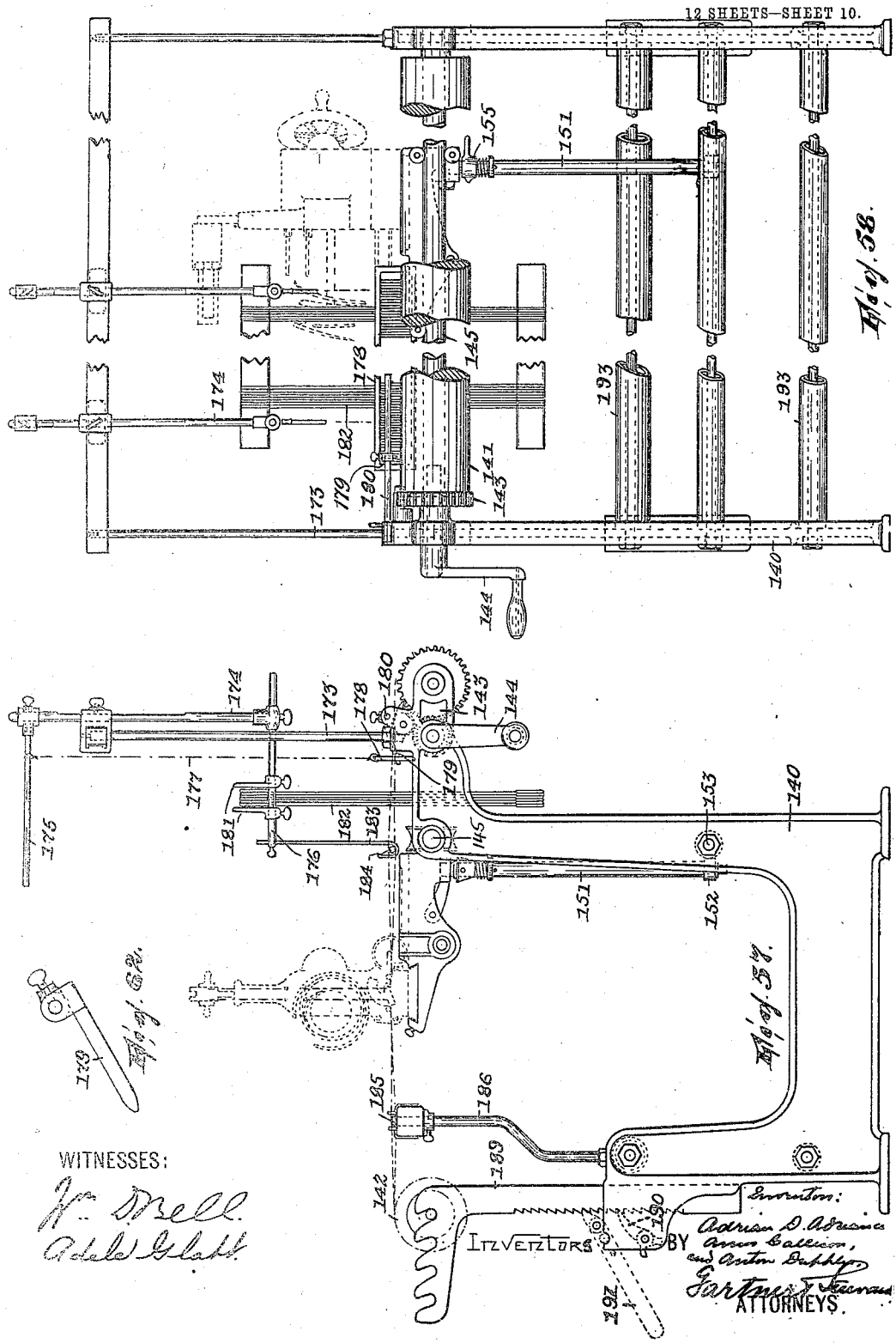

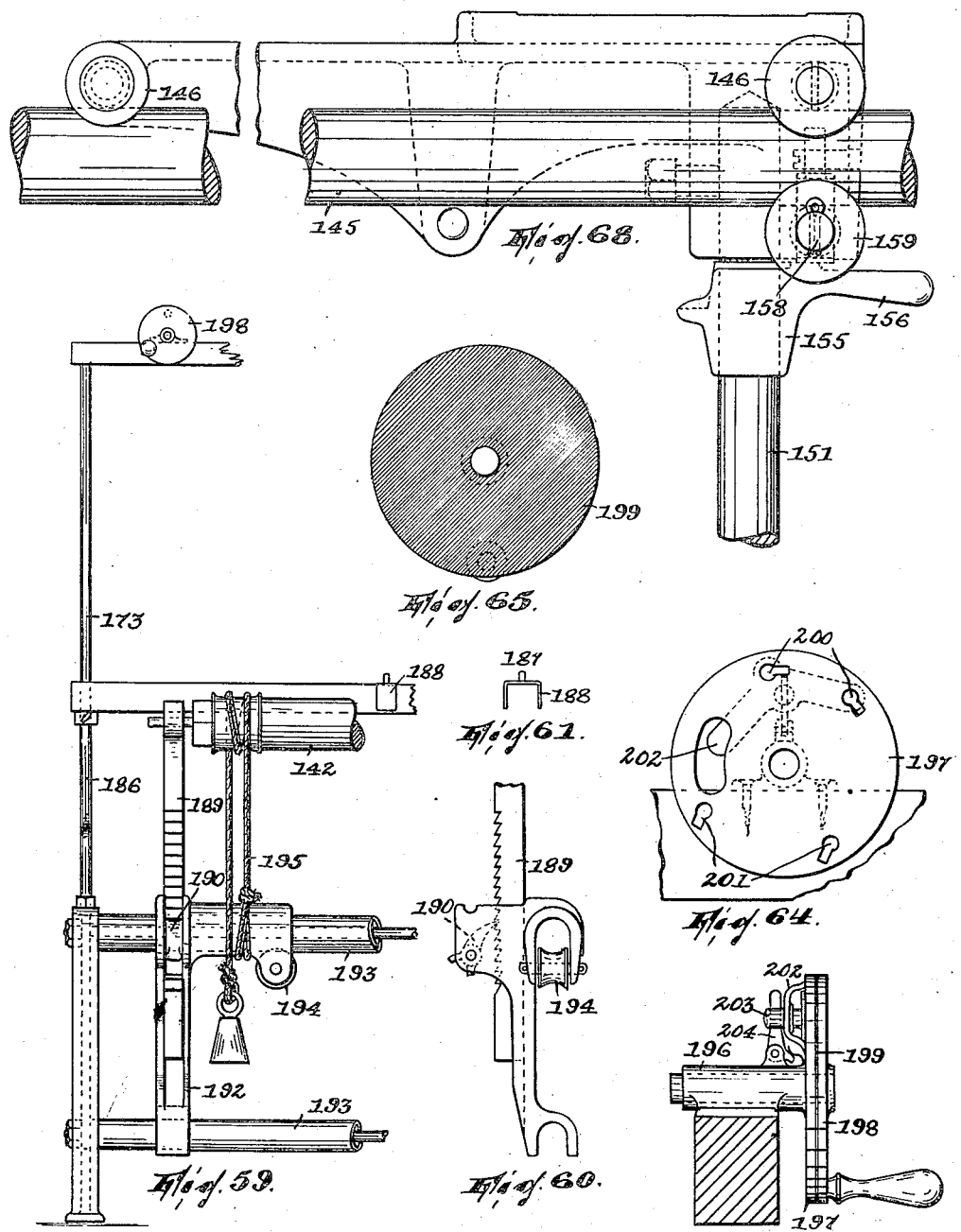

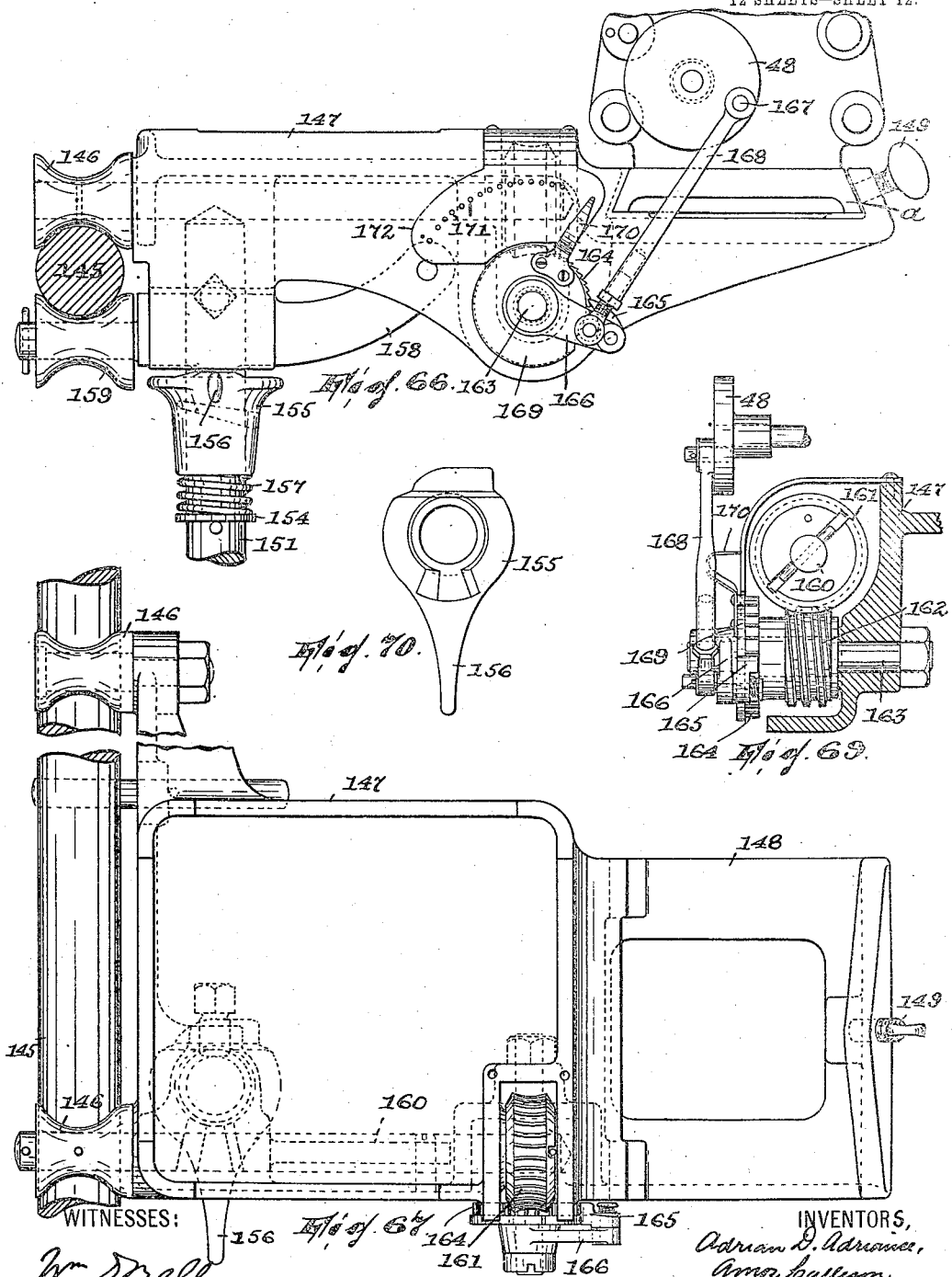

UNITED STATES PATENT OFFICE.

AMOS CALLESON AND ADRIAN DEXTER ADRIANCE, OF BROOKLYN, NEW YORK, AND ANTON DUPPLER, OF JERSEY CITY, NEW JERSEY, ASSIGNORS TO WARP TWISTING-IN MACHINE COMPANY, OF NEW YORK, N. Y., A CORPORATION OF NEW YORK.

WARP-TWISTING-IN MACHINE.

No. 810,711.　　　Specification of Letters Patent.　　　Patented Jan. 23, 1906.

Application filed December 24, 1904. Serial No. 238,199.

*To all whom it may concern:*

Be it known that we, AMOS CALLESON and ADRIAN DEXTER ADRIANCE, residing in the borough of Brooklyn, in the county of Kings and State of New York, and ANTON DUPPLER, residing in Jersey City, in the county of Hudson and State of New Jersey, citizens of the United States, have invented certain new and useful Improvements in Warp-Twisting-In Machines; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to the art of replenishing the warp in looms by twisting onto the ends of the old warp the ends of the new and it consists in certain improvements on machines of this nature secured to Albert Goss by United States Letters Patent Nos. 648,738, 675,350, and 686,724 and to Krey and Duppler by United States Letters Patent No. 695,566.

The present improvements will be found fully illustrated in the accompanying drawings, wherein—

Figure 1 is a view in side elevation of a twisting-in machine proper provided with so much of the said improvements as relate particularly thereto. Fig. 2 is a front view of the machine proper. Fig. 3 is a rear view, the driving-wheel in this figure and also in Fig. 2 being removed. Fig. 4 is a view like Fig. 2, except that certain parts are removed, so as to show internal mechanism, and with certain shafts shown in section. Fig. 5 is a side view of the frame of the twisting-in machine proper. Fig. 6 is a side view of a portion of said internal mechanism. Figs. 7 and 8 show one of the hook-bars. Fig. 9 is a view, partly in plan and partly in horizontal section, taken on line $r\,r$ in Fig. 1. Fig. 9$^a$ is an enlarged horizontal sectional view of the rear portion of the machine, taken in a plane coincident with that on which the sectional portion at the right hand of Fig. 9 is taken. Fig. 10 is an end view of the left-hand portion of the mechanism shown in Fig. 9. Fig. 11 is a fragmentary view, partly in side elevation and partly in vertical longitudinal central section, of the rear upper portion of the machine proper. Fig. 12 is a sectional view on the line $x\,x$ in Fig. 11, one of the plates 83 being removed. Fig. 13 is a rear view of what is shown in Fig. 11. Fig. 14 is an inside end view of parts $g$, $h$, and 133 seen in Fig. 9. Figs. 14$^a$ and 14$^b$ are plan and end views of the part $h$, respectively. Fig. 15 is a plan view of part 133. Fig. 16 is a sectional view on the line $s\,s$ in Fig. 9. Fig. 17 is a horizontal sectional view taken on line $t\,t$ in Fig. 1. Fig. 18 is a fragmentary view, in side elevation, of a part of what is shown in Fig. 17. Fig. 19 is a sectional view on line $u\,u$ in Fig. 17, certain pinions 66 and shaft 65 being removed. Figs. 20 and 21 illustrate details of a certain reciprocating frame 92 shown in Figs. 17 and 18. Figs. 22 and 23 are detail views of a fork 59 shown in Figs. 17 and 18 and also Fig. 19. Figs. 24 and 25 are detail views illustrating a part of the mechanism shown in Figs. 17, 18, and 19 for operating the spiral 67. Fig. 26 is a plan view of the twisting and thread-cutting mechanism. Fig. 26$^a$ is a view, partly in section and partly in elevation, of a part of the cutting mechanism, the section being taken transversely of a knife 30 and substantially central of its carrying-arm 31. Fig. 27 is a front view of said twisting and thread-cutting mechanism. Figs. 28 to 39, inclusive, are detail views of certain parts of the twisting mechanism, Figs. 32, 33, and 34 being sectional views on lines $y\,y$, $w\,w$, and $z\,z$, respectively, in Fig. 29. Figs. 40 and 41 are plan and front views, respectively, showing particularly a modified form of the thread-cutting mechanism. Fig. 42 is a side view of a thread-concentrator to be used with the thread-cutting mechanism shown in Figs. 40 and 41. Fig. 43 is a side view of the mechanism for holding the warps during the twisting operation. Fig. 44 is a top plan view of said mechanism. Fig. 45 is an end view taken in the direction of the arrow in Fig. 43 of the clamp-guiding arm of this mechanism with certain movable parts removed. Figs. 46 and 47 are front and side views, respectively, of a plate which is attached to the end of said body of the clamp. Figs. 48 to 53, inclusive, illustrate details of the clamp, Fig. 53 being a sectional view on line v v in Fig. 51. Fig. 54 is a fragmentary side view of the twisting-in machine proper, showing a modified construction of hook-bars. Figs. 55 and 56 are detail views of a certain fork to be used with said modified construction of hook-bars, Fig. 56 being a section on line q q in Fig. 54. Fig. 57 is a side view, and Fig. 58 a rear view, of a frame in which when the twisting-in is done outside of the loom the twisting-in machine proper is arranged so as to be movable therein transversely of the warp. Fig. 59 is a fragmentary front view of said frame. Fig. 60 is a side view of a detail shown in Fig. 59. Fig. 61 is a view of a detail shown in Fig. 59. Fig. 62 is a view of a detail shown in Fig. 58. Figs 63, 64, and 65 are views illustrating a means attached to the frame shown in Fig. 58 for facing up the wiping-surfaces of the members of the twisting mechanism. Fig. 66 is a side view, and Fig. 67 a plan view, of a certain carriage on which the twisting-in machine proper is mounted in the frame shown in Fig. 58. Fig. 68 is a rear view of said carriage. Figs. 69 and 70 illustrate details of said carriage, and Fig. 71 is a view illustrating diagrammatically how each warp is applied in position to be operated upon in the twisting-in machine proper.

The machine is designed especially with the idea of applying it in the operation of twisting in new warps in the process of weaving, thus employing it to supersede the usual hand operation. For this purpose it may be supported in operative position on the loom by any suitable brackets. However, we prefer to mount it upon an automatically-movable carriage, such as is shown in Figs. 66 to 70 of the drawings, said carriage being mounted upon the guides which are arranged in a frame, such as is shown in Figs. 57 to 60 of said drawings, and usually employed where it is expedient to remove the old warp, together with its harness and reed, from the loom in order to perform the twisting-in operation.

In the drawings, a designates the base of the machine, and b and c two uprights, the former of which is higher than the latter and is cast integral with the base, while the latter is preferably secured by screws d or otherwise to said base. In said uprights is journaled the main shaft e, carrying a bevel-gear f, which meshes with another bevel-gear g on a drive-shaft h. Said shaft h is journaled in a casing structure i, which is secured by screws to the back of the upright c and covers the bevel-gear g and certain other mechanism hereinafter described. On the shaft h is removably secured a drive-wheel j. The shaft h being arranged obliquely in the machine adds very materially to convenience in operating the machine, since all the power is taken in by hand through the drive-wheel j.

On shaft e are secured a gear k, a cam l having a peripheral cam-groove m, and a pinion n, the same being arranged in the order named, with the pinion next adjacent upright b. The front of the upright b is formed with a cavity o, and in this cavity are secured on shaft e a roller-carrying disk p and a pin-wheel q, disposed in the order named, with the disk adjacent the end of the shaft e.

The upright b is formed with an integral forwardly-projecting sleeve s, which constitutes a bearing for a shaft t, that carries a pinion (not shown) which meshes with another pinion (not shown) journaled at u in upright b and in turn in mesh with the gear n. The gearing just described is found in Fig. 6 of the Krey and Duppler patent aforementioned. As in that patent, the front end of shaft t has pivotally connected to it the rear end of an extension-shaft v, which carries at its end a spiral w and which may be folded around on shaft t, so as to turn the spiral out of the way. When shaft v is thus deflected, it may be supported by a rigid arm x, secured horizontally in a bracket y on upright b. The shafts t and v may be kept alined, as in the Krey and Duppler patent beforementioned, by a sleeve z, arranged to slide on them and cover their joint. The spiral w is generated at the end portion of shaft v and projects rearwardly. It carries two other spirals 1 and 2, the former projecting rearwardly and the latter forwardly, all said spirals coöperating to properly advance the threads.

3 is a normally stationary shaft mounted in both uprights b and c and carrying at its front end the stationary member of the twisting mechanism. In order to delicately adjust said member, this shaft is adapted for slight movement longitudinally, and to this end carries a fixed collar 4, between which and the upright c is coiled a spiral spring 5. On its rear end, which protrudes through the upright c, is secured by a pin 6 an arm 7, whose free end is forked and fits over a fixed pin 8 on said upright in such manner as to keep the shaft from turning. Said arm is split, as at 9, and in its split portion receives an adjusting-screw 10, which is tapped into the upright c. By manipulating this adjusting-screw the shaft 3 can be very delicately moved longitudinally so as to bring the stationary member of the twisting mechanism into just that relation with the movable member of said mechanism as is necessary to secure the perfect coöperation of said members. When once adjusted, the parts can be secured in fixed relation by a set-screw 11, mounted in the split portion of the arm and adapted for causing it to bind on the adjusting-screw 10.

The twisted mechanism is shown in Figs. 26 to 34 of the drawings. The stationary member thereof consists of a bracket 12, fixed to the end of shaft 3 and having a segment-shaped portion 13 and an arc-shaped pad comprising a metal back 14 and the pad proper, 15, which may be of rubber or other similar substance. The back 14 has headed studs or projections 16, and these fit into slits 17, formed in the edges of the segment 13. The slits 17 are so disposed that when in operation the wiping action of the twisting members forces the studs against the closed ends of said slits; but to insure against accidental separation of the parts a plate-spring 18 is mounted on the bracket 12 in such a manner as to bear against one of the studs 16 and hold it in its slit. The rotary member of the twisting mechanism consists of a segment-shaped bracket 19, carried by a spindle 20, and a pad comprising a metal back 21 and a face or pad proper, 22, formed of rubber or other similar material. The back 21 is secured to the segment 19 by headed studs or projections 23, engaging in slits 24, formed in the edge of the segment 19 in such manner that when in operation the action of the two members of the twisting mechanism forces said studs against the closed ends of the slits. In order to cushion the pad on the segment 19, spiral springs 25 are set in sockets 26, formed in the bottom of recess 27 in the segment 19, said springs being covered by small socketed plates 28, which directly bear against the back 21 of the pad. The pad is thus adapted to automatically adjust itself true to a proper coaction with the pad of the stationary member of the twisting mechanism. On the segment 13 is arranged a V-shaped thread-concentrator 29, into which the two threads to be twisted are ultimately forced by the spirals above described. With this as a detent coöperates for the purpose of cutting the threads a knife 30, which is held in an arm 31 in between a grooved projection 32 at the end of the latter and a plate-spring 33, which penetrates said arm, overlapping the knife, and is made to press against the latter by a set-screw 34, tapped into the arm on the farther side thereof. This arm is carried by a spindle 35, journaled in a bracket 36, secured to the bracket 12, said spindle also carrying a toe 37, against which wipes a cam 38 on the end of the spindle 20. After the cam has turned the arm 31 to effect the cutting of the thread the arm is returned by a spiral spring 39, connecting the toe 37 and the bracket 12.

In the modified form of the thread-cutting means shown in Figs. 40 to 42 the concentrator 29 has a rebend 40, receiving cutters 41 and 42, the former having a cutting edge 43 crossing that formed continuously at the periphery of the other, 42, which is a disk, the said cutters being mounted on a spindle 44, set in the concentrator 29 and the segment 13. The threads in order to be cut by the action of the twisting mechanism enter the notch formed by the intersection of the cutting edges of the cutters 41 and 42, which have a scissors-like effect, and the cutter 42 is arranged to rotate on the spindle 44, so that the portion of its edge which is presented to the threads is constantly changing. 44' is a spring pressing cutter 41 against cutter 42.

The spindle 20 is journaled in the uprights $b$ and $c$ and carries between said uprights a gear 45, meshing with a gear 46, in turn meshing with the gear $k$. The gear 45 and the hub 47 of a disk 48, secured on the rear end of the spindle, coact by abutting against opposite sides of the upright $c$ to prevent the spindle from lengthwise movement.

49 is a rock-shaft journaled in the uprights and carrying a crank 50, connected with an eccentric point 51 on the gear 46 by a link 52. The forward end of this shaft carries a finger 53 of the shape indicated in Figs. 1 and 2. In a sleeve 54, fixed in the upright $b$, is arranged a longitudinally-reciprocating shaft 55. This shaft carries at its rear end an arm 56, having a roller 57 at its upper end which moves in the camway of cam $l$ and which is penetrated by a fixed stud 58, projecting from the upright $b$, which acts to keep the arm vertical, and consequently shaft 55, from turning. The forward end of shaft 55 carries a fork 59 of substantially the shape best shown in Figs. 17 and 22, the ends of said fork being provided with wire thread-holders 60, having upward bends 61 therein. These wires by their inherent elasticity accurately keep the threads within the hold of the fork until the last moment, when they as freely permit the release of the threads.

On sleeve 54 is clamped by a set-screw 62 the split ring 63 of a bracket 64, in which is journaled a spindle 65, rotated from spindle 20 by bevel-gearing 66 and carrying a spiral 67, whereby after the threads are united they are forced out clear of the twisting mechanism. The spiral as it moves them keeps them separated, and thus prevents possible entanglements growing out of the torsional reaction of the threads following the twisting operation.

68 represents four sleeves which are fixed in the upright $b$. In these sleeves are journaled the hook-bars 68' (shown in Figs. 7 and 8,) having milled shoulders 69 thereon, whereby they may be manually rotated when occasion requires. Each hook-bar carries a pinion 70, arranged to freely rotate thereon and disposed in a cavity 71, formed in the back of the upright $b$, abutting against the vertical wall of said cavity. It also carries one member of a clutch 72, formed with a projection 73 on the side thereof adjacent the pinion, which latter forms the other member of the clutch, having a notch 74 to receive said projection. Clutch 72 is held against the pinion by a spiral spring 75, coiled about the hook-bar and disposed between clutch member 72 and plate 76. The several pinions 74 are in mesh with a gear 77, which is journaled on a pin 78, projecting rearwardly from the upright and supporting the front end of a guide 79, which is held to the rear upright by a screw 80. The plate 76 abuts against the front end of the guide 79 and is penetrated by the pin 78, a spacing-sleeve 81 being interposed between said plate and gear 77. The rear ends of the hook-bars thus journaled in the upright b, as well as the plate 76, are peripherally channeled, as at 82, to receive notched plates 83, fixed to wings 84, projecting laterally from a carriage 85, consisting of a block penetrated by the guide 79 and arranged to slide thereon. Said carriage carries an antifriction-roller 86, which works in the camway of the cam l, wherefrom said carriage is reciprocated. Periodic rotations are transmitted to the hook-bars by the mechanism best shown in Fig. 4, where 87 is a star-wheel adapted to be intermittently rotated by the pin on pin-wheel q, and where 88 is a gear rotating with said star-wheel and engaging one of the pinions 70. It will be understood that the hook-bars are arranged in vertical pairs in which the hook-bars in each pair are set relatively reversely, as in the patents hereinbefore referred to. It is found, however, in practice that one hook-bar in each pair can be dispensed with and in its place a fixed rod 89, used to maintain the cross. (See Fig. 54.) These rods are simply fixed in the sleeves 68, being made a little longer than the hook-bars, so as to insure against the threads slipping off their ends. It is found desirable to employ a stationary fork 90 to keep the fibers or filaments of the different threads from entanglement with each other, which fork can be secured to the plate 91, which covers the front face of the upright b.

92 is a reciprocatory frame which is arranged to be moved vertically, the same as in the patents above referred to—i. e., by a roller 93 on the disk p, which engages in a curved slot 94 in said frame 92. Said frame 92 is guided in the upright b, substantially the same as in the patents above mentioned, and it carries at its lower end, which is bifurcated, horizontal rods 95.

96 represents the stationary horizontal rods or thread-guides with which said rods 95 coact, the same being located one on each side of the pair of rods 95 and in a horizontal plane substantially between the limits of movement of said rods 95 vertically, said rods 95 and 96 coacting, as in the patents above referred to, to assist in any loosening of the threads from each other.

97 is an arm forming a guide for the thread-clamps, the same being secured to the top of the frame 92 by a screw 98. Said arm is formed with a longitudinal horizontal opening 99 and a longitudinal vertical opening 100, which latter produces two pairs of guideways 101. The vertical wall 102 at the free end of this arm is formed with two openings 103 and is covered by a rectangular plate 104. In holes 105 in this plate and in sockets 106 in the opposite end of the arm are mounted rods 107, on which are coiled springs 108, the openings 103 in the wall 102 being provided for the reception of said rods. On the guideways 101 move carriages 109, (see Fig. 49,) consisting of metallic plates having their upper and lower edges rebent to fit over the guideways 101. In the rebent portion of the top of each carriage is journaled an antifriction-roller 110, which runs on the top guideway 101. The springs 108 bear against lugs 111, projecting from the carriages 109, and may be adjusted by a block 112, with which they contact at their rear ends and which is mounted on said rods to slide thereon, having a set-screw 113, whereby it may be fixed at any desired point. The carriages are thus capable of moving independently of each other. The outer surface of each carriage is lined with horizontally-corrugated pads 114, of rubber or the like, against which may be made to impinge a correspondingly-corrugated pad 115 of a clip 116, hinged to the carriage at 117.

118 is a latch pivoted to the front end of each carriage and adapted to engage with a projection 119 on the clip 116 to hold the clip against the carriage closed. Forward movement of each carriage is limited by the lug 111 coming up against the plate 104.

120 represents latches for temporarily holding the carriages back against the tension of their spring, the same being pivoted in the upper end of the frame 92 and adapted to engage the nibs 121 on the top rebent portions of the carriages.

122 represents simply handles whereby to manually move the carriages.

123 is a horizontal bar carried in a bracket 124, fixed to the under side of the arm 97. The two sets of warp-threads, old and new, being clamped in the respective carriages, while the same are held back by their latches 120 when the carriages are released, the threads abut against the bar 123 and permit the advance of the carriage only so fast as the portions of the thread which stand vertical in the machine are cut off during the twisting operation.

The stop-motion mechanism shown in Figs. 9 to 13 will now be described. 125 designates the pivoted arms of a fork-shaped bracket which is fixed to the plate 91, said arms having intermeshing toothed segments 127', whereby when one arm is turned on its pivot the other will also turn. Thus in arranging the warps in the machine (it being understood that they at this time stand in between the arms 125 of the bracket) the bracket is first opened out by turning arms 125 outwardly, so as to afford clearance. In the ends of the arms 125 are pivoted fingers 126, projecting toward each other and connected with levers 127, pivoted concentrically with said arms by links 126'. Each lever 127 is connected with a lever 128, fulcrumed at the back of the upright c by a connecting-rod 129, made in two parts coupled together by a turnbuckle 130, so as to be adjustable longitudinally. 131 is a detector-lever fulcrumed in the same bracket 132 in which levers 128 are fulcrumed, each detector-lever 131 being pivotally connected with a lever 128. In the shaft h is journaled eccentrically thereof a longitudinally-extending rock-shaft 133, the arm 134 at the end thereof, which protrudes through the bevel-gear g, being normally in line to be engaged by one of the levers 131, (when the latter are disposed as seen in Fig. 11,) so as to be rocked thereby, and thus turn the arm 135 at the other end of said rock-shaft out of the way of a ball 136, arranged in a recess 137 in the bore 138 of the hand-wheel j. Normally a spring 139 keeps the arm 135 against the ball 136, and thus forms a clutch whereby the hand-wheel is interlocked with the shaft h; but when shaft 133 is turned arm 135 and ball 136 disengage, and so permit the hand-wheel to turn freely on the shaft. Therefore if both the threads which are immediately engaging the fingers 126 as they are advanced in the operation of the machine are intact they will move said fingers outwardly, and so cause levers 131 to be moved out of the path of the arm 134, so that the clutch will not be broken; but if one thread is broken the corresponding finger will not be actuated, and so its lever 131 will be left in the path of arm 134, so as to break the clutch and permit the hand-wheel to rotate without driving the machine. In order to reset the mechanism whereby the levers 131 are normally caused to be thrown out of the path of the arm 134, the means shown in Fig. 11 is employed, where 130' is a spring-actuated pawl having a laterally-projecting arm 131', which is movable into the path of a lug 132', carried by each link 129. When the carriage 85 moves back, the pawl, standing substantially vertically with its arm impinged against the lug 132', causes links 129 to be moved back also, thereby resetting the mechanism of which they form a part, and as the carriage reaches its rearmost position said pawl brings up against a lug 133', which turns it on its axis, depressing its arm out of engagement with the lugs 132'.

Referring to Figs. 57 to 70, 140 is a suitable frame in which is provided means for journaling the beam 141 for the old warp and the beam 142 for the new warp. 143 designates gearing driven by a crank 144, whereby to wind up onto the old warp-beam the new warp after the twisting-in is effected. 145 is a rod on which travel rollers 146, arranged at the back of the carriage 147, which at 148 receives the base a of the twisting-in machine proper, which may be clamped thereto by a thumb-screw 149 in a dovetailed groove 150. The carriage is supported partly on the rod 145 and partly by a leg 151, which projects downwardly, carrying an antifriction-roller 152, bearing against the side of one of the tie rods 153 of the frame 140. 154 is a shoulder on leg 151, between which and a cam 155, having a handle 156, a spiral spring 157 is disposed. This spring normally presses the cam up against a lever 158, which is fulcrumed in the carriage and carries at its free end a roller 159, taking against the under side of the rod 145. By turning the cam 155 the roller 159 is pressed up against the rod 145, so that the latter is tightly clamped between said roller and one of the rollers 146. Said roller 146 is mounted on a shaft 160, journaled in the carriage and carrying a worm-wheel 161, which meshes with a worm 162 on a stub-shaft 163, fixed in the carriage. Fixed to rotate with the worm is a ratchet 164, adapted to be engaged by a pawl 165, pivoted in the arm 166, fulcrumed on stub-shaft 163. Said arm is connected with an eccentric-point 167 on the disk 48 by an adjustable pitman 168. 169 is a disk having its edge bent over the periphery of the ratchet, except for a portion thereof, the same being mounted on shaft 163 between the ratchet and arm 166. Said disk carries a pointer 170, whose extremity may be engaged in any of the notches 171 of a dial 172 by turning the disk so the turned-over edge portion of the disk will be made to cut off more or less of the teeth of the ratchet from engagement with the pawl. Thus, the twisting-in machine proper being in operation, it will be caused to bodily advance across the warps as the work of twisting-in proceeds, according as the disk 169 is made to expose more or less of the teeth of the ratchet to the action of the pawl.

In a framework 173 are arranged for adjustment horizontally-vertical rods 174, carrying adjustable horizontal rods 175 and 176. From the rods 175 by cords or the like 177 the reed 178 of the loom is suspended, said reed being prevented from lateral movement by a knife 179, secured adjustably on a horizontal rod 180. On the rods 176 are clamps 181 for the upper shafts of the harness 182. Also adjustably secured in said rods are hooks 183 to hold a lease-rod 184. Another lease-rod 185 may be carried by a bracket 186, being laid in between lugs 187 of clips 188 on said bracket. The means for supporting the new warp-roll 142 may be brackets 189, having teeth adapted to be engaged by pawls 190 for holding the brackets at any desired height. 191 is a lever for adjusting each bracket to the desired height. One of these brackets may be guided directly in the frame 140. The other is arranged in a casting 192, mounted for movement laterally on tubular braces 193 of the frame 140. Said casting may have a roller 194 bearing against the upper tube 193, against which it is held by the tension means 195 for the warp-roll 142. On the framework 173 is mounted a bracket 196, having a plate 197, between which and a disk 198, having an abrading-face 199, the rubber faces of the two pads of the twisting mechanism may be disposed. The plate 197 is formed with orifices 200 and 201 to receive the studs on the metal backs of said pads, the studs for the pad of the movable member of the twisting mechanism being received by the orifices 200 and those for the pad of the stationary member being received by the orifices 201. By making the studs of the pad for the stationary member bind in the orifices 201 said pad will be held sufficiently fast in plate 197 during the operation of facing its rubber surface by means of the abrading-disk 198; but since the studs on the other pad are slightly longer and since the plate 197 is of uniform thickness a plate-spring 202, guided on a shank 203, projecting from the plate 197, may be arranged to abut against the heads of said studs, being there held by a spring-actuated lever 204.

Having thus fully described our invention, what we claim as new, and desire to secure by Letters Patent, is—

1. In a twisting mechanism, the combination of a frame, a rotary twisting member journaled in said frame, a normally fixed twisting member coactive with said rotary member, a shaft mounted in said frame and carrying the latter member, and means for adjusting said shaft longitudinally, substantially as described.

2. In a twisting mechanism, the combination of a frame, a rotary twisting member journaled in said frame, a normally fixed twisting member coactive with said rotary member, a spring-pressed shaft mounted in said frame and carrying the latter member, a spring normally acting on said shaft to move said latter member away from the other member, and means for adjusting said shaft longitudinally against the tension of its spring, substantially as described.

3. In a twisting mechanism, the combination of coactive twisting members one of which is adapted to wipe against the other to effect the twisting and the other of which is movable to and from the other, and adjustable means for holding the member which is movable to and from the other in a given position relatively to the other member, substantially as described.

4. In a twisting member for a twisting mechanism, a bracket and a pad removably mounted in said bracket, substantially as described.

5. In a twisting member for a twisting mechanism comprising members one of which is adapted to wipe against the other, a bracket and a pad detachably interlocked, the one of them having a projection engageable with the other to limit their relative movement past each other under the thrust of the other member of the twisting mechanism, substantially as described.

6. In a twisting mechanism, a twisting member comprising two plates, one of which carries the other and the other of which forms the twisting-pad, one of said plates having headed studs and the other having openings receiving said studs, substantially as described.

7. In a twisting mechanism, the combination of two members one of which is movable against the other to effect the twisting, one of said members comprising a support and a pad yieldable in said support to permit the various portions thereof to assume relatively different distances from the plane of operation of the other member of the twisting mechanism, substantially as described.

8. In a twisting mechanism, a twisting member comprising two plates detachably secured together and one of which carries the other and the other of which forms the twisting-pad, and cushioning means interposed between said plates, substantially as described.

9. The combination of the frame, a uniting mechanism, means for holding the threads while being operated upon, means for effecting the delivery of the threads to the uniting mechanism, and a fixed thread-concentrator located close to the uniting mechanism, substantially as described.

10. In a machine for twisting together and thus uniting threads or other filaments, the combination of the frame, a twisting mechanism, means for holding the threads while being operated upon, means for effecting the advance of the threads to the twisting mechanism, and a fixed thread-concentrator located close to the twisting mechanism and having a thread-engaging portion disposed obliquely to the line of advance of the threads, substantially as described.

11. In a machine for twisting together and thus uniting threads or other filaments, the combination of the frame, a twisting mechanism, means for holding the threads while being operated upon, means for effecting the advance of the threads to the twisting mechanism, a thread-detent located close to the twisting mechanism, and a thread-cutting means located in operative proximity to said detent, substantially as described.

12. In a machine for twisting together and thus uniting threads or other filaments, the combination of the frame, a twisting mechanism, means for holding the threads while being operated upon, means for effecting the advance of the threads to the twisting mechanism, a fixed V-shaped thread-concentrator located close to the twisting mechanism, and a thread-cutting means located in operative proximity to the concentrator, substantially as described.

13. In a mechanism for advancing the threads to be joined toward the twisting mechanism of a twisting-in machine, a fork having elastic tips forming the terminals thereof, substantially as described.

14. In a mechanism for advancing the threads to be joined toward the twisting mechanism of a twisting-in machine, a fork having elastic tips forming the terminals thereof and having thread-receiving bends formed therein, substantially as described.

15. The combinaton of a frame, a uniting mechanism, a means for advancing the threads successively to the uniting mechanism, a means for holding the threads comprising a thread-clamping mechanism normally movable in substantially the same direction as that of said threads toward the uniting mechanism, a thread-detent, and means for detaching the portion of the threads held by said holding means at a point between said detent and the uniting mechanism, substantially as described.

16. The combination of a frame, a uniting mechanism, and a means for holding the threads of the two warps comprising separate clamping means, one for each warp, movable independently in the direction of movement of the threads toward the uniting mechanism, substantially as described.

17. In a machine for twisting together and thus uniting threads or other filaments, the combination of the frame, a twisting mechanism, means for holding the threads while being operated upon, and a means, located in proximity to the twisting mechanism, for displacing out of the way of said twisting mechanism each united thread and keeping it separated temporarily from other threads, substantially as described.

18. In a machine for twisting together and thus uniting threads or other filaments, the combination of the frame, a twisting mechanism, means for holding the threads while being operated upon, and a revoluble spiral located in proximity to the twisting mechanism, and adapted to displace out of the way of said twisting mechanism the united threads, substantially as described.

19. The combination, with a frame, a thread-uniting means, means for holding the threads, means for effecting a relative movement between said thread-uniting and thread-holding means whereby to bring the threads to be united under the influence of said uniting means, a driving element, and power-transmitting means connecting said driving element and the uniting and advancing means, of means for effecting a break in the operative continuity of said power-transmitting means, said means being itself controlled by the advancing threads, substantially as described.

20. The combination, with a frame, a thread-uniting means, means for holding the threads, means for effecting a relative movement between said thread-uniting and thread-holding means whereby to bring the threads to be united under the influence of said uniting means, a driving element, and disconnective power-transmitting means connecting said driving element and the uniting and advancing means, of means for controlling the operative continuity of said power-transmitting means, said means being itself controlled by the advancing threads, substantially as described.

21. The combination, with a frame, a thread-uniting means, means for holding the threads, means for effecting a relative movement between said thread-uniting and thread-holding means whereby to bring the threads to be united under the influence of said uniting means, a driving element, and power-transmitting means connected to said driving element and the uniting and advancing means, of means for effecting a break in the operative continuity of said power-transmitting means comprising devices normally arranged to break the operative continuity of said power-transmitting means and other devices actuated by intact threads for moving said first-named devices out of position to break the continuity of said power-transmitting means, substantially as described.

22. The combination of a frame comprising a horizontal guideway, a mechanism for successively uniting the threads of warps, a carriage supporting said mechanism and movable on said guideway, and means for advancing said carriage on the guideway comprising a rotary device having frictional contact with said guideway, substantially as described.

23. The combination of a frame comprising a horizontal guideway, a mechanism for successively uniting the threads of warps, a carriage supporting said mechanism and movable on said guideway, means for advancing said carriage on the guideway comprising a rotary device bearing against said guideway, and means for clamping said device against the guideway, substantially as described.

24. The combination of a frame comprising a horizontal guideway, a mechanism for successively uniting the threads of warps, a carriage supporting said mechanism and movable on said guideway, a lever projecting across said guideway on the side thereof opposite to said device, and a cam for pressing said lever against the guideway, substantially as described.

25. In a mechanism for separating threads or other filaments, the combination, with a frame and with thread-sustaining means, the threads being adapted to be disposed in two sets of which the threads of the one intersect those of the other at predetermined intervals, of a revoluble hook-bar spacing, and adapted to alternately hold back the one and then the other of, said series of threads and thus successively free the intersecting threads, and a rod coöperating with said hook-bar to maintain the cross in the threads and having one end free and projecting in substantially the same direction as said hook-bar, substantially as described.

In testimony that we claim the foregoing we have hereunto set our hands this 20th day of December, 1904.

AMOS CALLESON.
ADRIAN DEXTER ADRIANCE.

Witnesses:
BENJAMIN ADRIANCE,
F. G. PITCHER.

In testimony that I claim the foregoing I have hereunto set my hand this 6th day of December, 1904.

ANTON DUPPLER.

Witnesses:
JOHN W. STEWARD,
ALFRED GARTNER.